United States Patent
Overbeeke et al.

(10) Patent No.: US 12,458,320 B2
(45) Date of Patent: Nov. 4, 2025

(54) CONTACT SENSOR POSITIONING SYSTEM, CANNULA INSERTION SYSTEM AND METHOD TO POSITION A CONTACT SENSOR

(71) Applicant: Vitestro Holding B.V., Utrecht (NL)

(72) Inventors: Toon Olaf Overbeeke, Utrecht (NL); Brian Robert Joseph, 'S-Gravenhage (NL); Johannes Gerhard Daniël Karssen, Utrecht (NL); Arris Cornelis Jonker, Utrecht (NL); Guido van Schie, Utrecht (NL); Mark de Greef, Utrecht (NL)

(73) Assignee: Vitestro Holding B.V., Utrecht (NL)

( * ) Notice: Subject to any disclaimer, the term of this patent is extended or adjusted under 35 U.S.C. 154(b) by 723 days.

(21) Appl. No.: 17/421,037

(22) PCT Filed: Jan. 7, 2020

(86) PCT No.: PCT/NL2020/050010
§ 371 (c)(1),
(2) Date: Jul. 7, 2021

(87) PCT Pub. No.: WO2020/145822
PCT Pub. Date: Jul. 16, 2020

(65) Prior Publication Data
US 2022/0054201 A1 Feb. 24, 2022

(30) Foreign Application Priority Data
Jan. 7, 2019 (NL) .................................... 2022351

(51) Int. Cl.
*A61B 8/08* (2006.01)
*A61B 8/00* (2006.01)
(Continued)

(52) U.S. Cl.
CPC ............ *A61B 8/0891* (2013.01); *A61B 8/085* (2013.01); *A61B 8/4218* (2013.01);
(Continued)

(58) Field of Classification Search
CPC .......... A61B 2017/3413; A61B 8/4218; A61B 8/0891; A61B 2034/2063; A61B 8/085
See application file for complete search history.

(56) References Cited

U.S. PATENT DOCUMENTS 5,616,135 A 4/1997 Thorne et al.
8,308,741 B2 11/2012 Hyde et al.
(Continued)

FOREIGN PATENT DOCUMENTS

CN 104605865 A 5/2015
CN 106580344 A 4/2017
(Continued)

OTHER PUBLICATIONS

International Search Report and Written Opinion mailed Feb. 19, 2020, International Application No. PCT/NL2020/050010, 10 pages.
(Continued)

*Primary Examiner* — Colin T. Sakamoto
(74) *Attorney, Agent, or Firm* — FORTEM IP LLP

(57) ABSTRACT

A cannula insertion system includes: a contact sensor positioning system arranged to determine a suitable location for insertion of the cannula, where the contact sensor positioning system includes: a contact sensor having a contact surface to be placed at least partially on the human or animal body to enable measurement with the contact sensor, a positioning device configured to support and position the contact sensor, and a control device arranged to control the positioning device to position the contact sensor in a desired position. The contact sensor positioning system includes one or more sensors to determine a position and/or contact force
(Continued)

related parameter representative for a position and/or contact force of the contact sensor, and a processing device to process the position and/or contact force related parameter and to provide a position control signal to the control device, where the contact sensor is an imaging sensor.

28 Claims, 5 Drawing Sheets

(51) Int. Cl.
    *A61B 17/34* (2006.01)
    *A61B 34/20* (2016.01)
(52) U.S. Cl.
    CPC ............ *A61B 8/4245* (2013.01); *A61B 8/429* (2013.01); *A61B 8/4281* (2013.01); *A61B 8/54* (2013.01); *A61B 2017/3413* (2013.01); *A61B 2034/2063* (2016.02)

(56) References Cited

U.S. PATENT DOCUMENTS

| | | | |
|---|---|---|---|
| 8,888,714 B1 | 11/2014 | Soto | |
| 9,364,171 B2 | 6/2016 | Harris et al. | |
| 9,743,875 B2 | 8/2017 | Maguire et al. | |
| 9,913,605 B2 | 3/2018 | Harris et al. | |
| 10,238,327 B2 | 3/2019 | Harris et al. | |
| 10,555,696 B2 | 2/2020 | Breteau et al. | |
| 11,224,369 B2 | 1/2022 | Harris et al. | |
| 2003/0233046 A1* | 12/2003 | Ferguson | A61B 17/3403 600/437 |
| 2005/0020921 A1 | 1/2005 | Glassell et al. | |
| 2007/0010742 A1* | 1/2007 | Torp | A61B 5/6843 600/437 |
| 2007/0088346 A1 | 4/2007 | Mirizzi et al. | |
| 2008/0195043 A1 | 8/2008 | Schwach et al. | |
| 2008/0275396 A1 | 11/2008 | Neerken et al. | |
| 2009/0118670 A1 | 5/2009 | Neerken et al. | |
| 2009/0216204 A1 | 8/2009 | Bhavaraju et al. | |
| 2009/0275823 A1 | 11/2009 | Ayati et al. | |
| 2010/0210946 A1* | 8/2010 | Harada | A61B 8/4281 600/443 |
| 2011/0166451 A1 | 7/2011 | Blaivas et al. | |
| 2011/0301500 A1 | 12/2011 | Maguire et al. | |
| 2012/0172710 A1* | 7/2012 | Anthony | G01N 29/226 600/442 |
| 2012/0259220 A1 | 10/2012 | Sheldon et al. | |
| 2013/0035591 A1 | 2/2013 | Hyde et al. | |
| 2013/0041253 A1 | 2/2013 | Hyde et al. | |
| 2015/0065916 A1 | 3/2015 | Maguire et al. | |
| 2015/0272544 A1* | 10/2015 | Raum | A61B 8/58 600/472 |
| 2017/0028142 A1 | 2/2017 | Song et al. | |
| 2017/0278427 A1 | 9/2017 | Karssen et al. | |
| 2017/0296148 A1 | 10/2017 | Niemiec et al. | |
| 2018/0000511 A1* | 1/2018 | Fujie | A61B 8/085 |
| 2018/0125450 A1* | 5/2018 | Blackbourne | A61B 8/0891 |
| 2018/0161519 A1 | 6/2018 | Browka et al. | |
| 2018/0193598 A1 | 7/2018 | Sarkar et al. | |
| 2019/0150895 A1* | 5/2019 | Tian | A61B 8/4209 |
| 2019/0357828 A1 | 11/2019 | Harris et al. | |
| 2021/0267540 A1 | 9/2021 | Overbeeke et al. | |
| 2021/0378627 A1 | 12/2021 | Yarmush et al. | |
| 2022/0054062 A1 | 2/2022 | Overbeeke et al. | |
| 2022/0167892 A1 | 6/2022 | Harris et al. | |
| 2022/0354399 A1 | 11/2022 | Overbeeke et al. | |

FOREIGN PATENT DOCUMENTS

| | | |
|---|---|---|
| CN | 113081276 A | 7/2021 |
| EP | 2654593 | 10/2013 |
| EP | 2749303 A1 | 7/2014 |
| EP | 3 342 352 A1 | 7/2018 |
| EP | 3831303 A1 | 6/2021 |
| EP | 3928699 A1 | 12/2021 |
| IN | 112604094 A | 4/2021 |
| JP | 5701439 B1 * | 4/2015 |
| WO | 0056213 A1 | 9/2000 |
| WO | 2006120619 A2 | 11/2006 |
| WO | 2006131881 A1 | 12/2006 |
| WO | 2012088471 A1 | 6/2012 |
| WO | 2015/099849 A1 | 7/2015 |
| WO | 2015179505 A1 | 11/2015 |
| WO | 2017145141 A1 | 8/2017 |
| WO | 2020017965 A1 | 1/2020 |
| WO | 2020145821 A1 | 7/2020 |
| WO | 2020145822 A1 | 7/2020 |
| WO | 2020017965 A9 | 1/2021 |
| WO | 2022090201 A1 | 5/2022 |

OTHER PUBLICATIONS

Balter, Max Loeb, "Robotic Devices for Automated Venipuncture and Diagnostic Blood Analysis", Dissertation submitted to the Graduate School—New Brunswick, Rutgers, The State University of New Jersey, May 2017, 298 pages.

Chen, Alvin I., "Image-Guided Robotics for Autonomous Venipuncture", Dissertation submitted to the Graduate School—New Brunswick, Rutgers, the State University of New Jersey, Oct. 2016, 272 pages.

Paquit, Vincent, et al., "Combining near-infrared illuminants to optimize venous imaging", Proc. SPIE 6509, Medical Imaging 2007: Visualization and Image-Guided Procedures, Mar. 21, 2007, 10 pages.

Paquit, Vincent C., et al., "Near-infrared imaging and structured light ranging for automatic catheter insertion", Proceedings of SPIE—The International Society for Optical Engineering, Mar. 2006, 10 pages.

* cited by examiner

CONTACT SENSOR POSITIONING SYSTEM, CANNULA INSERTION SYSTEM AND METHOD TO POSITION A CONTACT SENSOR

CROSS-REFERENCE TO RELATED APPLICATIONS

This application is the National Stage of International Application No. PCT/NL2020/050010, filed Jan. 7, 2020, which claims the benefit of Netherlands Application No. 2022351, filed Jan. 7, 2019.

FIELD OF THE INVENTION

The present invention relates to a contact sensor positioning system, a cannula insertion system comprising such contact sensor positioning system and a method to position a contact sensor.

BACKGROUND OF THE INVENTION

US2008/0275396 A1 discloses an automated cannula insertion system for autonomously inserting a cannula into a blood vessel of a human or an animal, the contents of which are herein incorporated by reference in its entirety.

The cannula insertion system of US2008/0275396 A1 comprises an acquisition module that allows for determining at least a location of a blood vessel underneath the skin and is enabled to determine a puncture location that is suitable for inserting a cannula into the blood vessel. The cannula insertion system comprises an actuator for moving and aligning the cannula to a determined position and to autonomously insert the cannula into the blood vessel for multiple purposes, such as blood withdrawal, venous medication and infusions.

It is necessary that an automated cannula insertion system for autonomously inserting a cannula into a human or animal body, for example into a blood vessel of a human or an animal, is properly operated.

In an embodiment of the cannula insertion system of US2008/0275396 A1, an ultrasound transducer is provided to obtain image data that can be used to localize a blood vessel.

Such ultrasound transducer is a contact sensor that needs contact with the human or animal body in order to obtain a signal that can be used to determine for example the location of a blood vessel in the human or animal body. To position such contact sensor in a proper measurement position, a contact sensor positioning system may be provided. In an embodiment, the contact sensor positioning system may comprise a contact sensor having a contact surface to be placed at least partially on the human or animal body to enable measurement with said contact sensor. The contact sensor positioning system may further comprise a positioning device configured to support and position the contact sensor, and a control device arranged to control the positioning device to position the contact sensor in a desired position.

US2018/0000511 A1 discloses a system for assisting blood vessel puncture under ultrasonic guidance. The system is configured to generate puncture assisting information for determining whether or not puncture can be performed on the basis of the collapsed state of the blood vessel caused by the pressing action of the ultrasonic probe against the skin. The puncture assisting information comprises a vascular compression rate representing the ratio of the current vascular diameter during acquisition of ultrasonic images to the diameter of a standard blood vessel in a state in which the skin is not pressed by the ultrasonic probe; and a puncture feasibility rate representing how readily puncture is performed in the state of current deformation of the blood vessel caused by the pressing action of the ultrasonic probe EP 2342352 A1 discloses a fully automated ultrasound scanner and scan detection method. The scanner comprises an ultrasonic probe, a driving system to move the ultrasonic probe and a flexible structure on which the ultrasonic probe is mounted. The flexible structure provides a mechanical system that enables the ultrasonic probe to be always along a curve of a skin surface. The probe is mounted on a rotatable mount that keeps the probe perpendicular to the skin surface during scanning.

SUMMARY OF THE INVENTION

An object of the present invention is to provide a cannula insertion system that is capable of automatically positioning a contact sensor, for example an ultrasound transducer, on the skin of a human or animal body, for example to determine a suitable location for insertion of a cannula into the human or animal body.

The present invention provides a cannula insertion system as described herein.

In accordance with the present invention, the cannula insertion system comprises a contact sensor positioning system comprising one or more sensors to determine a position and/or contact force related parameter representative for a position and/or contact force of the contact sensor.

A processing device is provided to process the position and/or contact force related parameter and to provide on the basis of the position and/or contact force related parameter a position control signal to the control device. The control device may use the position control signal to control the positioning device to position the contact sensor in a desired position. Thus, in dependence of the position and/or contact force related parameter the position of the contact sensor may be adapted.

The contact sensor is an imaging sensor, wherein the processing device is configured to determine the position control signal by image processing of the images obtained by the imaging sensor. In such system, the images obtained by the imaging sensor are not only used to analyse the respective body part of the patient, but also to determine a position and/or contact force related parameter on the basis of which the position of the contact sensor may be adapted.

In an embodiment, wherein the processing device is configured to determine a blood vessel deformation parameter of a blood vessel present in an image obtained by the imaging sensor as a basis for the position control signal, wherein the blood vessel deformation parameter is based on the cross section of the blood vessel. The cross-section of the blood vessel can be used to determine a blood vessel deformation parameter. When no external pressure is exerted on the blood vessel, the cross-section of the blood vessel will be substantially circular. When a pressure is exerted on the blood vessel by the contact sensor, the cross-section may change to a more elliptic shape. By determining characteristics of this shape of the cross-section, the deformation of the blood vessel may be determined without the need to compare with a standard blood vessel as required in EP 2342352 A1. This results in a more straightforward determination of the deformation of the blood vessel without the need to rely on external information.

In an embodiment, the blood vessel deformation parameter may be determined on the basis of a relationship between a long axis and a short axis of the cross-section of the blood vessel, for example a ratio between the long axis and a short axis of the cross-section of the blood vessel.

In an embodiment, the position and/or contact force related parameter comprises a contact force with which the contact surface is pressed against the human or animal body, for example on the skin of the human or animal body. A contact liquid, such as an ultrasound gel, or a solid pad, such as a solid hydrogel, may be used to improve the contact between the human or animal body and the contact surface. When a layer of contact liquid is present between the contact surface and the human or animal body, for example the skin, the contact surface is regarded to be placed on the human or animal body.

During use, the contact sensor should be properly pressed on the human or animal body in order to create a good contact between the contact surface of the contact sensor and the human or animal body. At the same time, the pressure should not be too high. For example, in case the contact sensor positioning system is used in a cannula insertion system configured to insert a cannula into a blood vessel of the human body, the pressure should not be too high in order to avoid that the blood vessel is squeezed by the contact sensor. This squeezing may hinder the insertion of the cannula into the blood vessel, since the height of the cross section in the squeezing direction will be substantially reduced by the pressure exerted by the contact sensor. Moreover, the force exerted by the contact sensor may result in deformation of the tissue. With increasing pressure the extent of deformation of the tissue may also increase. The sensor signal of the contact sensor, such as an ultrasound image may not properly show the configuration of the tissue when the tissue is substantially deformed by the pressure exerted by the contact sensor.

The one or more sensors may comprise a force sensor to determine the force on the contact surface as a position and/or contact force related parameter. The sensor signal obtained by the force sensor may be fed to the processing device.

In an embodiment, the position and/or contact force related parameter comprises a size and/or position of a surface area of the contact surface which is in contact with the human or animal body. The contact surface of the contact sensor is the surface of the contact sensor that, when in contact with the human or animal body, may enable the contact sensor to provide a representative signal of tissue in contact with the contact sensor. When the contact sensor is for example placed on the skin of a human or animal body, only a surface area of the contact surface may be in contact the skin, while another surface area of the contact surface is not in contact with the skin of the human or animal body. The contact surface may for example have a rectangular shape, whereby, for instance when the contact surface is placed on a curved skin surface, for instance an arm surface, only a surface area of the contact surface is in contact with the human or animal body.

The surface area of the contact surface which is in contact with the skin may not only enable the contact sensor to provide a signal representative for the tissue on which the contact sensor is placed, but also provide information with respect to the position of the contact sensor on the skin of the human or animal body. For example, when the surface area is relatively small, i.e. only a relatively small part of the contact surface is in contact with skin, this may indicate that the pressure exerted with the contact sensor on the skin is relatively low. In such case, it may be desirable to move the contact sensor towards the human or animal body to increase the pressure with which the contact sensor is pressed against the skin. This will normally increase the surface area of the contact surface which is in contact with the skin.

Further, it is desirable that the surface area in contact with the human or animal body is a center part of the contact surface. When the surface area of the contact surface in contact with the skin is out of the center of the contact surface the processing device may be configured to provide a position control signal to adapt the position of the contact sensor to align the surface area in contact with the human or animal body with the center part of the contact surface.

The position control signal may be arranged to slide the contact sensor in an alignment direction in order to align the surface area in contact with the human or animal body with a center part of the contact surface. Additionally, or alternatively, the position control signal may be arranged to adapt the orientation of the contact sensor with respect to the human or animal body to align the surface area in contact with the human or animal body with a center part of the contact surface.

In an embodiment, the position and/or contact force related parameter comprises a torque being exerted on the contact surface. The contact surface is pressed in longitudinal direction, i.e. substantially perpendicular to the surface of the contact surface. When the surface area of the contact surface in contact with the human or animal body is not aligned with a center part of the contact surface pressing the contact sensor on the human or animal body will result in a torque in the contact sensor. The one or more sensors may comprise a torque sensor to measure a torque exerted on the contact sensor, for example the contact surface. The sensor signal of this torque sensor may be fed, as a position and/or contact force related parameter to the processing device.

In an embodiment, the contact sensor and the one or more sensors are the same sensor. The sensor signal obtained by the contact sensor may be used, directly or indirectly, as a position and/or contact force related parameter representative for a position and/or contact force of the contact sensor. In such case the contact sensor itself may be used as a sensor to obtain a position and/or contact force related parameter.

In an embodiment, the contact sensor is an imaging sensor. An imaging sensor is a sensor that is arranged to provide images of internal tissue of a human or animal body. In some types of imaging sensors direct contact between an outer surface of the human or animal body, for example the skin, and a contact surface of the contact sensor is required to obtain a sensor signal on the basis of which an image of the tissue below the outer surface of the human or animal body can be constructed. An example of such sensor which is both a contact sensor and an imaging sensor is an ultrasound transducer, also known as an ultrasound probe.

In an embodiment, the processing device is configured to determine the position control signal by image processing of the images obtained by the imaging sensor. When the contact sensor is an imaging sensor and also used as a sensor to determine the position and/or contact force related parameter, the position and/or contact force related parameter may be determined by processing of the images that are obtained by the contact sensor.

In an embodiment, the processing device is configured to determine a blood vessel deformation parameter of a blood vessel present in an image obtained by the imaging sensor as a basis for the position control signal. A cross section of a vein can be used to determine the pressure that is exerted by a contact sensor on the human or animal body. The cross section of a vein will normally be circular. When a force is exerted on the vein, the cross section of the vein may change. The force may result in a deformation of the cross section of the vein. Typically, the vein may have, in the deformed state, a substantially elliptic cross section having a short axis in the direction of compression, i.e. the direction in which the contact sensor is pushed on the vein, and a long axis in a direction substantially perpendicular to the compression direction.

The blood vessel deformation parameter may be based on a relationship between the long axis and the short axis of the vein, for example a ratio between the long axis and the short axis. This relationship may be used as a parameter representative for a force exerted by the contact sensor on the human or animal body.

In an embodiment, the blood vessel deformation parameter may be used to determine whether a blood vessel is a vein or an artery. When the location of a blood vessel is determined, the blood vessel deformation parameters can be established when different contact forces are applied. A relatively small change in the blood vessel deformation parameter for different contact forces, indicates that the blood vessel is an artery, while a relatively large change in the blood vessel deformation parameter for different contact forces indicates that the blood vessel is a vein.

In an embodiment, the processing device is configured to determine the position and/or size of the surface area of the contact surface which is in contact with the human or animal body in an image obtained by the imaging sensor as a basis for the position control signal. On the basis of the images, it may be determined which surface area of the contact surface of the contact sensor is in contact with the human or animal body, and which part of the surface area of the contact sensor is not in contact with the human or animal body. As explained above, the location of the surface area which is in contact with the human or animal body can be used to determine a position control signal to adapt, when needed, the position of the contact sensor with respect to the human or animal body.

In an embodiment, the processing device is configured to determine a position and/or size of a vein present in an image obtained by the imaging sensor as a basis for the position control signal.

In an embodiment, the one or more sensors comprise at least one contact force sensor to determine a contact force exerted on the contact surface. The contact force is a force with which the contact surface is pushed against the human or animal body. As discussed above, this force should not be too low, but also not too high. The contact force sensor may be arranged in the contact sensor between a main body of the contact force sensor and the contact surface. The contact sensor may be aligned with a central part of the contact surface of the contact force sensor. In an alternative embodiment, the contact force sensor may be mounted in the contact sensor positioning system or in the connection between the contact sensor and the contact sensor positioning system.

In an embodiment, the one or more sensors comprise a torque sensor and/or a combination of at least two contact force sensors to determine a torque exerted on the contact surface. The torque sensor and/or the combination of at least two contact force sensors may be mounted in or on the contact sensor, in the contact sensor positioning system or in the connection between the contact sensor and the contact sensor positioning system.

In an embodiment, the one or more sensors comprise a first contact force sensor arranged in or on the contact sensor to determine a first contact force exerted on a first location on the contact surface and a second contact force sensor to determine a second contact force exerted on a second location on the contact surface, wherein the first location and the second location are spaced with respect to each other, and wherein the processing device is configured to provide a position control signal to adapt the position of the contact sensor on the basis of the first contact force and the second contact force.

By providing the first and second contact force sensors, a first contact force and a second contact force may be determined at spaced locations in the contact surface. The first contact force and the second contact force can be used to determine the contact force that is exerted on the tissue on which the contact surface is at least partially placed and the torque which is exerted on the contact surface due to (mis)alignment of the contact surface and the surface area of the contact surface which is in contact with the human or animal body, for example the skin of the human or animal body.

In alternative embodiments, three or more contact forces sensors may be provided on or in the contact sensor to determine the contact force at different locations of the contact surface.

In an embodiment, the processing device is arranged to control a contact force and/or position of the contact surface of the contact sensor on the human or animal body on the basis of measurements of the one or more contact force sensors and/or the torque sensor and measurements of the contact sensor. Thus, in such cannula insertion system, both the contact force sensors and/or the torque sensor and the contact sensor are used to provide a position and/or contact force related parameter to the processing device, and the processing device is arranged to provide a position control signal to the control device on the basis of both position and/or contact force related parameters.

For example, the measurements of the one or more contact force sensors and/or the torque sensor may be used to control a contact force with which the contact surface of the contact sensor is pressed on the human or animal body. This contact force control loop may be aimed at controlling the contact force to a contact force set-point. The contact force set-point may be determined on the basis of the measurements of the contact sensor. In such embodiment, the processing device may be arranged to determine a blood vessel deformation parameter on the basis of the images obtained with the contact sensor as described above, and to determine on the basis of the blood vessel deformation parameter a contact force set-point for the contact surface of the contact sensor resulting in a position control signal to the control device.

In an embodiment, the one or more sensors comprise a first distance sensor arranged to measure a first distance between the contact surface and the human or animal body near a first end of the contact surface and a second distance sensor arranged to measure a second distance between the contact surface and the human or animal body near a second end of the contact surface, the second end being opposite to the first end, wherein the processing device is configured to provide a position control signal to adapt the position of the contact sensor on the basis of the first distance and the second distance. The first distance and the second distance may for example be used to adapt the orientation of the contact sensor.

In an embodiment, the contact sensor positioning system comprises a sensor configured to provide a sensor signal representative for a skin surface shape of a human or animal body, and wherein the processing device is configured to process the position and/or contact force related parameter and the sensor signal representative for a skin surface shape of the human or animal body to provide the position control signal.

In an embodiment, the cannula insertion system comprises:
   a cannula insertion device configured to insert the cannula into the human or animal body,
   a cannula insertion device positioning system to support and position the cannula insertion device, and
   a control device arranged to control the positioning system to position the cannula insertion device in a suitable position to insert the cannula into human or animal body.

In an embodiment, the cannula insertion system is an autonomous cannula insertion system constructed to autonomously insert the cannula into the human or animal body.

This means that the cannula insertion system may be configured to carry out, without any interaction of a human operator, the following steps:
   measuring, with at least the contact sensor, one or more sensor signals representative for a suitable location to introduce a cannula into the human or animal body, for example a blood vessel in which the cannula may be inserted,
   determining, with a processing device, a suitable location for introduction of the cannula into the human or animal body
   positioning, on the basis of the determined location, with the positioning device, the cannula insertion device in a suitable position to insert the cannula into the human or animal body, and
   inserting the cannula into the human or animal body, for example the blood vessel.

In an embodiment, the cannula is a needle. The cannula may be any tube like element that is configured to be introduced into a human or animal body, for example into a blood vessel. Preferably, the cannula is a needle, in particular a needle suitable to draw blood from a blood vessel.

In an embodiment, the cannula insertion system is constructed to autonomously draw blood from a blood vessel. In other embodiments, the cannula insertion system may be used to insert a cannula into a body part of a human or animal, for example for venous medication, infusions, biopsy, robot surgery, laparoscopic surgery, etc.

The invention further relates to a method to automatically position a contact sensor having a contact surface to be placed at least partially on the human or animal body to enable measurement with said contact sensor, comprising the steps of:
   measuring, using one or more sensors, a position and/or contact force related parameter representative for a position and/or contact force of the contact sensor,
   processing with a processing device the position and/or contact force related parameter sensor and providing a position control signal to the control device on the basis of the position and/or contact force related parameter.
   controlling with the control device a positioning device configured to support and position the contact sensor to position the contact sensor in a desired position.

In an embodiment, the position and/or contact force related parameter comprises a contact force with which the contact surface is pressed against the human or animal body.

In an embodiment, the method comprises the step of determining a blood vessel deformation parameter of a blood vessel present in an image obtained by the imaging sensor as a basis for the position control signal, wherein the blood vessel deformation parameter is based on the cross section of the blood vessel.

In an embodiment, the blood vessel deformation parameter is determined on the basis of a relationship between a long axis and a short axis of the cross section of the blood vessel.

In an embodiment, the position and/or contact force related parameter comprises a size and/or position of a surface area of the contact surface which is in contact with the human or animal body.

In an embodiment, the contact sensor and the one or more sensors are the same sensor, wherein the contact sensor is an imaging sensor, and wherein the step of processing the position and/or contact force related parameter comprises image processing of the images obtained by the imaging sensor.

In an embodiment, the step of processing the position and/or contact force related parameter comprises determining a blood vessel deformation parameter of a blood vessel present in an image obtained by the imaging sensor as a basis for the position control signal.

In an embodiment, the step of processing the position and/or contact force related parameter comprises determining the position and/or size of the surface area of the contact surface which is in contact with the human or animal body in an image obtained by the imaging sensor as a basis for the position control signal.

BRIEF DESCRIPTION OF THE DRAWINGS

Further characteristics and advantages of the cannula insertion system of the invention will now be explained by description of an embodiment of the invention, whereby reference is made to the appended drawings, in which.

DETAILED DESCRIPTION OF THE INVENTION

Figure 1:
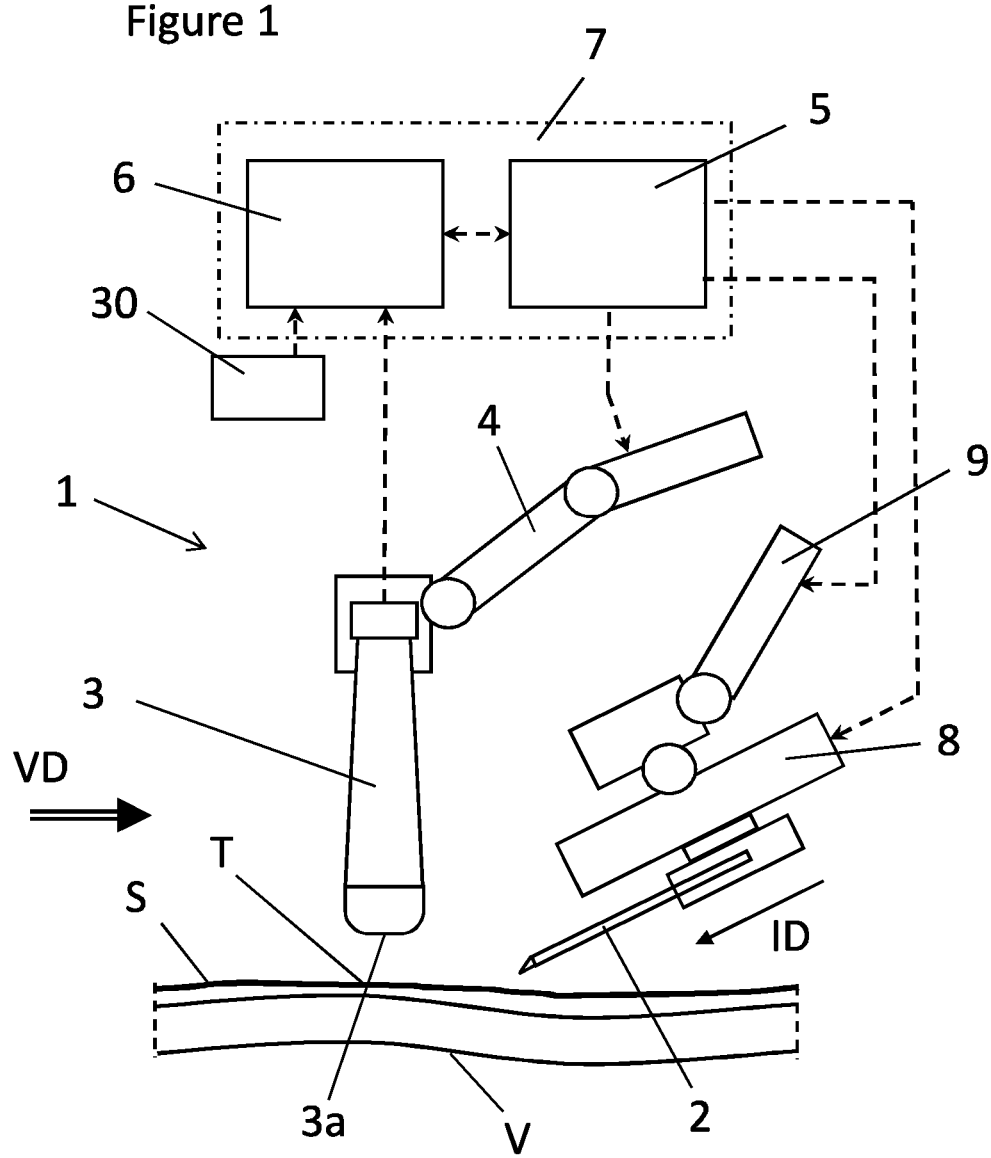
FIG. 1 shows schematically a cannula insertion system according to an embodiment of the invention.

FIG. 1 shows a cannula insertion system, generally denoted by reference numeral 1. The cannula insertion system 1 is configured to autonomously insert a cannula 2, for example a needle into a vein V of a human or animal. The cannula insertion system 1 as shown in FIG. 1 is in particular configured to autonomously draw blood from a blood vessel. In alternative embodiments, the cannula insertion system 1 may be configured to arrange a cannula in a vein V for venous medication and/or infusions. An automatic cannula insertion system may also be configured as a biopsy device, a surgery robot, a laparoscopic robot, or any other system that may use an autonomous cannula insertion system in a body part of human or animal.

To draw blood from the vein V, the cannula insertion system 1 may be arranged to determine a location of a blood vessel underneath the skin S of the human or animal, insert a cannula 2 into the vein V and draw blood from the vein V without direct interaction of an operator of the cannula insertion system 1.

Autonomous cannula insertion systems are known in the prior art. For example, US2008/0275396 A1 discloses an automated cannula insertion system for autonomously inserting a cannula into a blood vessel of a human or an animal, the contents of which are herein incorporated by reference in its entirety.

The cannula insertion system 1, shown in FIG. 1, comprises an ultrasound transducer 3 to obtain one or more sensor signals that are representative for the location of a vein V in the human or animal. The ultrasound transducer 3 is a contact sensor having a contact surface 3a to be arranged onto the skin S of a human or animal body. During use contact between the contact surface 3a of the ultrasound transducer 3 and the skin S is required in order to obtain relevant data with respect to the location of the vein V. A liquid, such as an ultrasound gel, may be used to improve the contact between the skin S and the contact surface 3a of the ultrasound transducer 3.

When the contact surface 3a of the ultrasound transducer 3 is properly placed on the skin S of an animal or human, an ultrasound image of the tissue below the skin S may be obtained.

A contact sensor positioning device 4 is provided to support and position the ultrasound transducer 3, for example to guide the ultrasound transducer on the skin S of the human or animal in a target area T. The target area T is an area of the skin S underneath which the presence of a vein V suitable for insertion of a cannula 2 is expected and which is examined by the ultrasound transducer 3.

The target area T may be determined by obtaining images of the skin of a human or animal, for example using a NIR (near infrared) sensor 30, and determining on the basis of the images an area in which it is likely that a blood vessel suitable for insertion of a cannula will be found.

The ultrasound transducer 3 provides a sensor signal representative for a location of the vein V. The sensor signal is fed into a processing device 6 which is arranged to process the sensor signal. The control device 5 and the processing device 6 may be comprised in a single processor 7, such as a PC.

The control device 5 is arranged to control the contact sensor positioning device 4. The contact sensor positioning device 4 comprises one or more actuators to position the ultrasound transducer 3 in a suitable position for measuring one or more sensor signals that are representative for the location of a vein V. The contact sensor positioning device 4 may comprise a robot arm 4a. The contact sensor positioning device 4 may be arranged to move the ultrasound transducer 3.

In practice, multiple sensors may be used to collect data relevant for the determination of the location of a vein V underneath the skin S of a human or animal. These sensors may include contact sensors, that need to be placed on the skin S to obtain relevant data, and non-contact sensors, that can obtain information at a distance from the skin S.

On the basis of the sensor signal, or sensor signals, the processing device 6 determines the location of a vein V suitable for the insertion of the cannula 2. On the basis of this location, the processing device 6 may determine an insertion path for insertion of the cannula 2 into the vein V.

The cannula 2 is arranged on a cannula insertion device 8. The cannula insertion device 8 is arranged to insert the cannula 2 in an insertion direction ID through the skin S and into the vein V along the insertion path determined by the processing device 6. A longitudinal axis of the cannula 2 is aligned with the insertion direction ID.

The cannula insertion device 8 is supported by a positioning device 9, for example a robot arm, that is arranged to bring the cannula insertion device 8 in a position from which the cannula insertion device 8 may move the cannula 2 along the insertion path. The cannula insertion device 8 and the positioning device 9 are also controlled by the control device 5.

In an embodiment, the ultrasound transducer 3 and the cannula insertion device 8 may be provided as a single unit supported by a single positioning device. The ultrasound transducer 3 and the cannula insertion device 8 may be in a fixed positional relationship with respect to each other in six degrees of freedom. In such embodiment, the contact sensor positioning device 4 and the positioning device 9 of the cannula insertion device 8 may be the same positioning device, for example the same robot. In an alternative embodiment, the ultrasound transducer 3 and the cannula insertion device 8 may be connected to each other in a fixed relationship in one or more degrees of freedom. For example, the ultrasound transducer 3 and the cannula insertion device 8 may be arranged in a single unit, whereby the cannula insertion device 8 is rotatable with respect to the ultrasound transducer 3 to adapt the insertion direction ID with respect to the ultrasound transducer 3. In such embodiment, the ultrasound transducer 3 and the cannula insertion device 8 are in a fixed positional relationship in five degrees of freedom. In this embodiment, the contact sensor positioning device 4 and the positioning device 9 of the cannula insertion device 8 may also be the same positioning device.

Figure 2A:
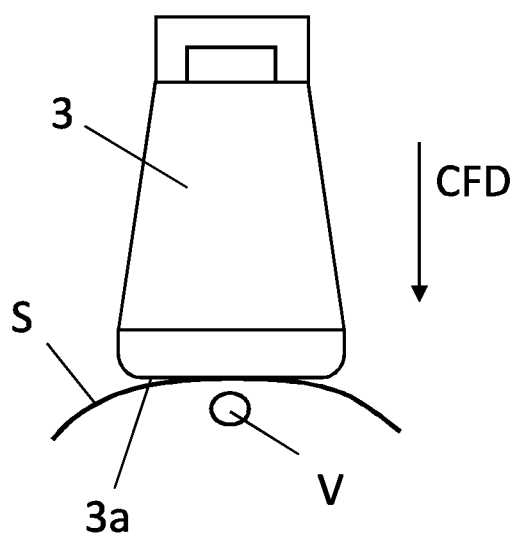
FIGS. 2*a*, 3*a*, 4*a* and 6*a* each show the ultrasound transducer of FIG. 1 arranged on the skin of a human or animal body.

FIG. 2a shows the ultrasound transducer 3 arranged on a skin S of a human arm, seen from the direction VD indicated in FIG. 1. The surface of the skin S is curved. In order to obtain useful sensor signal of the ultrasound transducer 3, the contact surface 3a of the ultrasound transducer 3 should be pressed with a suitable contact force against the skin S. The contact force is the force with which the ultrasound transducer 3 is pressed on the skin S in a contact force direction CFD perpendicular to the contact surface 3a of the ultrasound transducer 3.

The contact force should not be too low as this may lead to improper imaging of the tissue. The contact force should also not be too high as this may lead to high deformation of the tissue. High deformation may result in unreliable imaging of the tissue, as the configuration of tissue is influenced due to the pressure exerted by the ultrasound transducer 3. The pressure may also result in squeezing of a vein V, which may substantially hinder the insertion of the cannula 2 into the vein V.

Since the surface of the skin S may be curved it may not be possible to arrange the complete contact surface 3a of the ultrasound transducer 3 in contact with the skin S, even though the ultrasound transducer 3 is pressed with a suitable contact force on the skin.

Figure 2B:
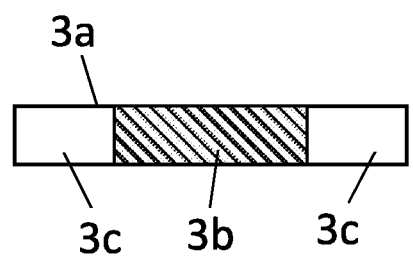
FIGS. 2*b*, 3*b*, 4*b* and 6*b* each show the first surface area in contact with the skin of the contact surface of the ultrasound transducer of FIG. 1.

FIG. 2b shows the contact surface 3a of the ultrasound transducer 3 as shown in FIG. 2a. Only a first surface area 3b (hatched area in FIG. 2b) in a center part of the rectangular contact surface 3a is in contact with the skin S. Two second surface areas 3c at opposite ends of the contact surface 3a are not in contact with the skin, or at least not sufficient in contact with the skin to provide a proper sensor signal to construct an image of the tissue below the skin S.

The processing device 6 is arranged to determine whether the contact surface 3a or part thereof is in proper contact with the skin S during measurement with the ultrasound transducer 3.

The size of the surface area 3b in contact with the skin can be used as a contact force parameter that is representative for the contact force with which the ultrasound transducer 3 is pressed on the skin S.

Figure 3A:
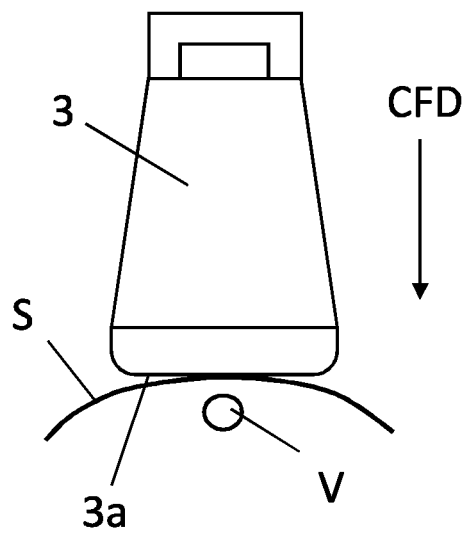
Figure 3B:
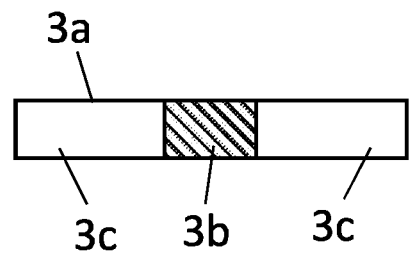

FIG. 3a shows the ultrasound transducer 3 positioned on the skin S with a reduced contact force. FIG. 3b shows the first surface area 3b which is in contact with the skin and the second surface areas 3c which are not in contact with the skin S. The first surface area 3b (hatched area in FIG. 3b), as shown in FIG. 3b, is smaller than the first surface area shown in FIG. 2b. From the smaller first surface area 3b it may be determined that the contact force is too low, e.g. below a threshold value. The processing device may provide a position control signal to the control device 5. On the basis of this position control signal, the control device 5 will control the contact sensor positioning device 4 to increase the contact force with which the ultrasound transducer 3 is pressed on the skin S.

Figure 4A:
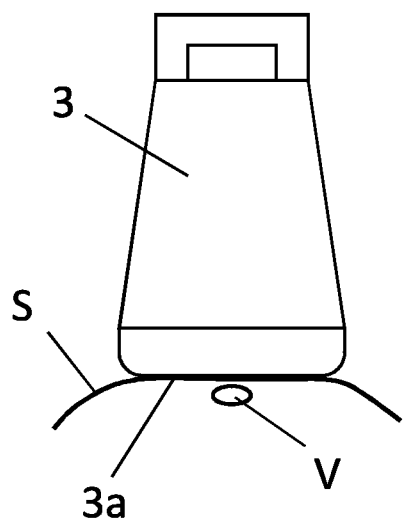
Figure 4B:
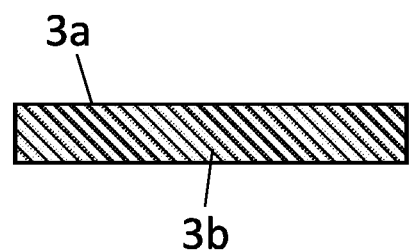

Similarly, FIGS. 4a and 4b show an example in which the contact force is too high. In FIGS. 4a and 4b, the complete contact surface 3a is in contact with the skin S of the human or animal body. This means that the first surface area 3b (hatched area in FIG. 4b) in contact with the skin S covers the complete contact surface 3a. The vein V is substantially compressed in this position of the ultrasound transducer 3. This may hinder insertion of a cannula 2 into the vein V.

When the processing device 3 determines that the first surface area 3b completely covers the contact surface 3a, or more generally that the first surface area 3b is larger than desired, the processing device 3 may provide a position control signal to the control device 5 to adapt the contact force with which the ultrasound transducer 3 is pressed against the skin S, for example by adapting the position of the ultrasound transducer 3.

The desired size of the first surface area may be a specific value or a range in which the first surface area 3b should fall. This specific value or range may depend on the shape of the human or animal body, for example the curvature of the skin S on which the ultrasound transducer 3 is placed, but also on other factors, such as type of tissue, fat percentage, purpose of imaging, depth of area of interest, etc. The shape of the human or animal body may for example be obtained by the NIR sensor 30, or any other suitable sensor. When the cannula insertion system 1 is typically used for a single location of the human body, for example to draw blood from an area of the lower arm of a person, the shape may be preset, or be provided by the operator. The input of the operator may for example be a small, medium or large arm, and the processing device 6 will select a specific value or range of the first surface area 3b to be in contact with the skin S on the basis of this input.

Figure 5A:
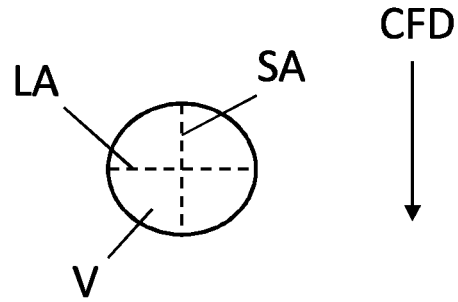
FIGS. 5*a* and 5*b* show the vein of FIGS. 2*a* and 4*a* in more detail.
Figure 5B:
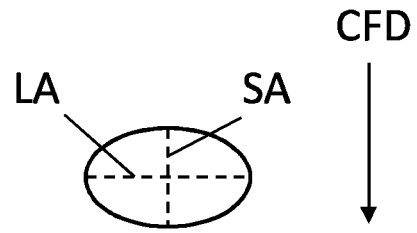

FIGS. 5a and 5b show in more detail the vein V of FIG. 2a and FIG. 4a, respectively. It can be seen that, due to the larger contact force in the state of FIG. 4a, the vein V is compressed more than in the state shown in FIG. 2a. As discussed above, it is undesirable that the vein V is compressed as this may hinder the insertion of a cannula 2 into the vein V. On the basis of the images constructed by the processing device 6 on the basis of the sensor signal of the ultrasound transducer 3, the processing device 6 may determine a blood vessel deformation parameter representative for deformation of the blood vessel. This blood vessel deformation parameter can be used as a contact force parameter for calculating a position control signal that can be fed to the control device 5 to adapt the position of the ultrasound transducer 3 when needed.

The vein V will have, in the deformed state, a substantially elliptic cross section having a short axis SA and a long axis LA. The short axis SA extends in the direction of compression, i.e. the contact force direction CFD in which the contact surface 3a is pushed on the skin S and therewith, indirectly, on the vein V. The long axis LA extends in a direction substantially perpendicular to the contact force direction CFD. The blood vessel deformation parameter that can be used to determine the deformation of the vein V is for example the ratio between the long axis and the short axis of the vein V. With increasing deformation this ratio will also increase. When the ratio is too high, the processing device 6 may provide a position control signal to the control device 5 to adapt the position of the ultrasound transducer 3 to reduce the contact force.

In other embodiments other relationships between the long axis LA and the short axis SA may be used to determine a blood vessel deformation parameter that can be used to quantify the deformation of the vein V.

In an embodiment, the blood vessel deformation parameter may be used to determine whether a blood vessel which is found in the images of the ultrasound transducer 3 is a vein or an artery. When the location of the blood vessel is determined, the blood vessel deformation parameter can be established when different contact forces are applied by the contact surface 3a on the skin S. When there is a relatively small change in the blood vessel deformation parameter when different contact forces are applied on the skin S, this indicates that the blood vessel is an artery. A relatively large change in the blood vessel deformation parameter when different contact forces are applied on the skin S, indicates that the blood vessel is a vein.

Figure 6A:
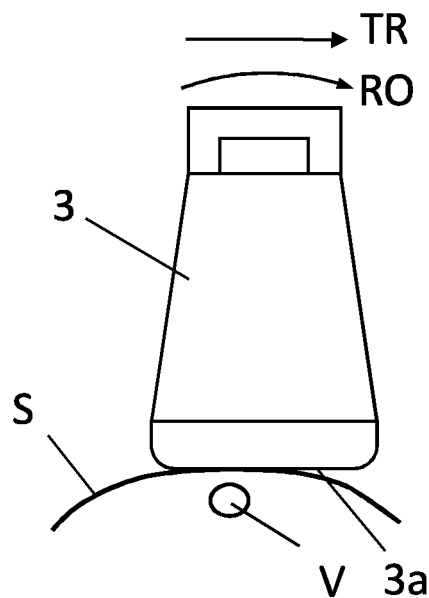
Figure 6B:
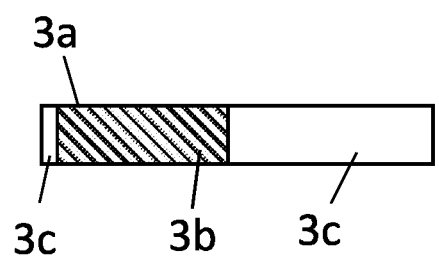

FIGS. 6a and 6b show the ultrasound transducer 3 positioned on the skin S of an arm of a person, corresponding to the embodiment shown in FIGS. 2a and 2b. The first surface area 3b in contact with the skin S is not centered with respect to the center of the contact surface 3a. One second surface area 3c at one end of the contact surface 3a has a substantially different size than the other second surface area 3c at the opposite end of the contact surface 3a. Such position of the ultrasound transducer 3 may be generally undesirable, for example as the center part is a more suitable area for imaging.

Also in an embodiment, in which the contact sensor 3 and the cannula insertion device 8 are provided as a single unit and the cannula 2 is aligned with the center part of the contact surface 3a of the contact sensor 3, this center part may need to be aligned with a blood vessel in order to align the cannula 2 with the blood vessel in order to allow insertion of the cannula 2 into the blood vessel.

The location of the first surface area 3b may be used as a position related parameter that can be used to adapt the position of the ultrasound transducer 3 in order to align the first surface area 3b with the center of the contact surface 3a.

The position control signal that is provided on the basis of the position of the first surface area 3b with respect to the center of the contact surface 3a, can be used to translate the ultrasound transducer 3 in a translation direction TR and/or rotate the ultrasound transducer 3 in a rotation direction RO to adapt the position and/or orientation of the ultrasound transducer 3 with respect to the human or animal body.

For instance, when the contact sensor 3 and the cannula insertion device 8 are arranged in a single unit supported by a single positioning device, the position and/or orientation of the cannula 2 may be adapted, to keep the cannula 2 in alignment with a vein V for insertion of the cannula 2 into the vein V.

This translation and rotation of the contact sensor 3 may for example be advantageously be applied when the contact sensor 3 is moved along the arm of a patient to obtain a series of images at a number of successive positions along the arm. For example, the contact sensor positioning system may be configured to obtain successive images along the longitudinal direction of the vein, wherein each image is substantially perpendicular to the longitudinal direction of the vein. The vein may however not extend in a longitudinal direction of the arm.

To obtain the successive images, the contact sensor may be arranged at one side of target area T, such as for example the side directed to the hand of the respective arm. The vein V may be arranged in the middle of the image obtained by the contact sensor 3 by translation and/or rotation of the contacts sensor 3 as explained above. Then the contact sensor 3 may be moved over the inner elbow (cubital fossa) for example in the direction from the hand towards the shoulder of the patient. After each displacement of a predetermined distance of for example 2 to 10 mm, the contact sensor 3 will obtain an image which is processed by the processing device 6.

The processing device 6 may determine whether the contact sensor 3 is still properly positioned with respect to the arm. For example, when the vein V moves out of the centre of the image, the contact sensor may be translated and/or rotated to properly align the contact sensor 3 with the vein V. Also, when it is determined by the processing device 6 that the contact force on the arm is too low or too high, for example on the basis of the first surface area 3b which is in contact with the skin and the second surface areas 3c which are not in contact with the skin S and/or on the basis of the blood vessel deformation parameter, the position of the contact sensor 3 in contact force direction CFD may be changed.

By continuously monitoring the position of the contact sensor 3 with respect to the vein V, and when needed adapting the position and/or orientation of the contact sensor 3, the quality of the successive images of the vein V can be substantially improved.

In the event that the processing device 6 determined that the vein V is no longer visible in the images obtained by the contact sensor 3, the movement of the contact sensor 3 along the arm may be stopped. The position of the contact sensor 3 may be changed by translation and/or rotation until the vein V is found. The contact sensor 3 may then continue with the scanning movement along the arm or the contact sensor 3 may be brought back to the start position to start the scanning movement along the arm.

In the above embodiments, the sensor signals of the contact sensor itself, e.g. the ultrasound images obtained with the ultrasound transducer 3, are used to determine a position and/or contact force parameter that can be used as a basis to control a position of the contact sensor to adapt the position of the contact surface 3a with respect to the skin S and/or to adapt a contact force with which the contact surface 3a is pressed on the skin S.

Figure 7:
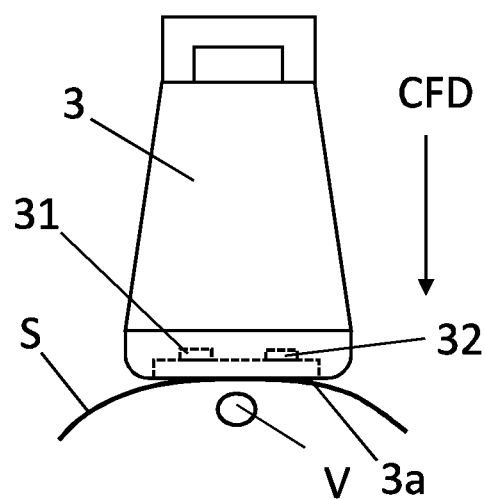
FIG. 7 shows a first alternative embodiment of an ultrasound transducer.

FIG. 7 shows an alternative embodiment in which the contact force exerted with the contact sensor is determined using a first contact force sensor 31 arranged to determine a first contact force exerted on a first location on the contact surface 3a and a second contact force sensor 32 arranged to determine a second contact force exerted on a second location on the contact surface 3a. The first location and the second location are spaced with respect to each other. The first contact force and the second contact forces are forces with which the contact surface 3a is pushed against the human or animal body.

The first contact force measured by the first contact sensor 31 and the second contact force measured by the second contact sensor 32 can be used to determine the total contact force that is exerted on the skin S on which the contact surface 3a is at least partially placed and the torque which is exerted on the contact surface 3a due to (mis)alignment of the contact surface 3a and the surface area of the contact surface 3a which is in contact with the skin S.

The contact force with which the contact surface 3a is pressed on the skin S is related to the sum of the first contact force and the second contact force measured by the first contact force sensor 31 and the second contact force sensor 32. On the basis of a signal comprising the sum of the first contact force and the second contact force, for example the mean of the first contact force and the second contact force, the control device may be provided to adapt the position of the ultrasound transducer 3 to adjust the contact force, when desired.

The difference between the first contact force and the second contact force is representative for the orientation of the contact surface with respect to the skin S. When the first contact force is substantially larger than the second contact force, the surface area in contact with the skin S is not centered with a center part of the contact surface 3a. This means that a torque is exerted on the contact surface 3a of the ultrasound transducer 3. By adapting the position and/or orientation of the ultrasound transducer 3 the position of the surface area in contact with the skin S with respect to the contact surface 3a may be improved.

In an alternative embodiment, in which only the total contact force needs to be controlled, only one contact force sensor may be provided. In other embodiments, three or more contact force sensor may be provided.

In the embodiment of FIG. 7, the first contact force sensor 31 and the second contact force sensor 32 are arranged in or on the ultrasound transducer 3. In alternative embodiments, the first contact force sensor 31 and the second contact force sensor 32 may be arranged in the contact sensor positioning device 4 or in the connection between the contact sensor 3 and the contact sensor positioning device 4. Also, the torque may be measured by a torque sensor provided on or in the contact sensor 3 in the contact sensor positioning device 4 or the connection between them.

The position control of the ultrasound transducer 3 on the basis of the first contact force sensor 31 and the second contact force sensor 32, or alternatively using one contact force sensor, is suitable to maintain the contact force at a desired contact force set-point. The contact force set-point may depend on the specific circumstances and for example be dependent on elasticity of the tissue of the respective human or animal body at the location where the contact sensor is placed, the depth of the blood vessel and/or size of the blood vessel.

The contact force set-point may be determined on the basis of processing of the images obtained with the ultrasound transducer 3, for instance, on the basis of the determination of the blood vessel deformation parameter as described above. The contact force set-point determined on the basis of the images is used as input for the control loop that uses the contact force sensor(s) to control the contact force with which the ultrasound transducer 3 is pressed on the skin of the human or animal body.

Figure 8:
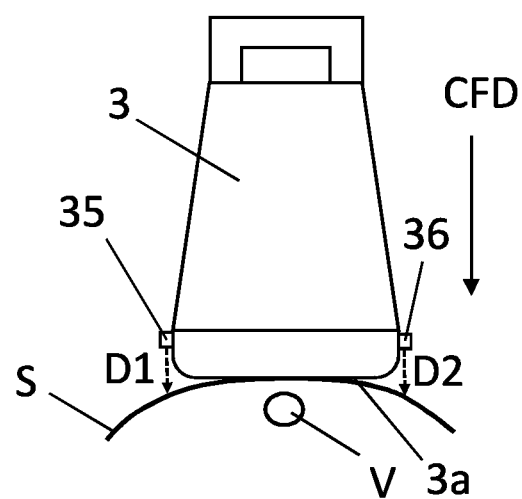
FIG. 8 shows a second alternative embodiment of an ultrasound transducer.

FIG. 8 shows another embodiment of the ultrasound transducer 3. The ultrasound transducer 3 comprise a first distance sensor 35 arranged to measure a first distance D1 between the contact surface 3a and the skin S near a first end of the contact surface 3a and a second distance sensor 36 arranged to measure a second distance D2 between the contact surface 3a and the skin S near a second end of the contact surface 3a. The first distance sensor 35 and the second distance sensor 36 are arranged at opposite sides of the ultrasound transducer 3.

The processing device 6 is configured to provide a position control signal to adapt the position of the ultrasound transducer 3 on the basis of the first distance D1 and the second distance D2. The first distance and the second distance may for example be used to adapt the position and/or orientation of the ultrasound transducer 3.

Hereinabove different embodiments of a positioning system for an ultrasound transducer 3 have been described, in which different arrangements to provide a contact force and/or position parameter are obtained that allow to automatically adjust a position of the ultrasound transducer 3 in order to adapt the contact force with which the ultrasound transducer 3 is pressed on the skin S and/or to adapt the position, by translation and/or rotation, of the contact surface 3a of the ultrasound transducer 3 with respect to the skin S.

The contact force and/or position parameter may be determined on the basis of the sensor signals of the ultrasound transducer 3 or separate sensors may be provided to determine the contact force and/or position parameter.

One or more embodiment of the invention are described as follows:

1. A contact sensor positioning system, comprising:
   a contact sensor having a contact surface to be placed at least partially on the human or animal body to enable measurement with said contact sensor,
   a positioning device configured to support and position the contact sensor,
   a control device arranged to control the positioning device to position the contact sensor in a desired position,
   characterized in that the contact sensor positioning system comprises one or more sensors to determine a position and/or contact force related parameter representative for a position and/or contact force of the contact sensor, and
   a processing device to process the position and/or contact force related parameter and to provide a position control signal to the control device on the basis of the position and/or contact force related parameter.
2. The contact sensor positioning system of embodiment 1, wherein the position and/or contact force related parameter comprises a contact force with which the contact surface is pressed against the human or animal body.
3. The contact sensor positioning system of embodiment 1 or 2, wherein the position and/or contact force related parameter comprises a size and/or position of a surface area of the contact surface which is in contact with the human or animal body.
4. The contact sensor positioning system of any of the embodiments 1-3, wherein the position and/or contact force related parameter comprises a torque being exerted on the contact surface.
5. The contact sensor positioning system of any of the embodiments 1-4, wherein the contact sensor and the one or more sensors are the same sensor.
6. The contact sensor positioning system of any of the embodiments 1-5, wherein the contact sensor is an imaging sensor.
7. The contact sensor positioning system of embodiments 5 and 6, wherein the processing device is configured to determine the position control signal by image processing of the images obtained by the imaging sensor.
8. The contact sensor positioning system of embodiment 7, wherein the processing device is configured to determine a blood vessel deformation parameter of a blood vessel present in an image obtained by the imaging sensor as a basis for the position control signal.
9. The contact sensor positioning system of embodiment 7 or 8, wherein the processing device is configured to determine the position and/or size of the surface area of the contact surface which is in contact with the human or animal body in an image obtained by the imaging sensor as a basis for the position control signal.
10. The contact sensor positioning system of any of the embodiments 7-9, wherein the processing device is configured to determine a position and/or size of a vein present in an image obtained by the imaging sensor as a basis for the position control signal.
11. The contact sensor positioning system of any of the embodiments 1-10, wherein the one or more sensors comprise at least one contact force sensor to determine a contact force exerted on the contact surface.
12. The contact sensor positioning system of any of the embodiments 1-11, wherein the one or more sensors comprise a torque sensor and/or a combination of at least two contact force sensors to determine a torque exerted on the contact surface.
13. The contact sensor positioning system of any of the embodiments 1-12, wherein the one or more sensors comprise a first distance sensor arranged to measure a first distance between the contact surface and the human or animal body near a first end of the contact surface and a second distance sensor arranged to measure a second distance between the contact surface and the human or animal body near a second end of the contact surface, the second end being opposite to the first end, wherein the processing device is configured to provide a position control signal to adapt the position of the contact sensor on the basis of the first distance and the second distance.
14. The contact sensor positioning system of any of the embodiments 1-13, wherein the contact sensor is an ultrasound transducer.
15. The contact sensor positioning system of any of the preceding embodiments, wherein the positioning device comprises a robot arm.
16. A cannula insertion system to insert a cannula into a human or animal body, comprising:
   the contact sensor positioning system of any of the preceding embodiments arranged to determine a suitable location for insertion of the cannula,
   a cannula insertion device configured to insert the cannula into the human or animal body,
   a cannula insertion device positioning system to support and position the cannula insertion device, and
   a control device arranged to control the positioning system to position, on the basis of the determined location for insertion of the cannula, the cannula insertion device in a suitable position to insert the cannula into human or animal body.
17. The cannula insertion system of embodiment 16, wherein the cannula insertion system is an autonomous cannula insertion system constructed to autonomously insert the cannula into the human or animal body.

18. The cannula insertion system of embodiment 16 or 17, wherein the cannula insertion system is constructed to autonomously draw blood from a blood vessel.

19. A method to automatically position a contact sensor having a contact surface to be placed at least partially on the human or animal body to enable measurement with said contact sensor, comprising the steps of:

measuring using one or more sensors a position and/or contact force related parameter representative for a position and/or contact force of the contact sensor, processing with a processing device the position and/or contact force related parameter sensor and providing a position control signal to the control device on the basis of the position and/or contact force related parameter.

controlling with the control device a positioning device configured to support and position the contact sensor to position the contact sensor in a desired position.

20. The method of embodiment 19, wherein the position and/or contact force related parameter comprises a contact force with which the contact surface is pressed against the human or animal body.

21. The method of embodiment 19 or 20, wherein the position and/or contact force related parameter comprises a size and/or position of a surface area of the contact surface which is in contact with the human or animal body.

22. The method of any of the embodiments 19-21, wherein the contact sensor and the one or more sensors are the same sensor, wherein the contact sensor is an imaging sensor, and wherein the step of processing the position and/or contact force related parameter comprises image processing of the images obtained by the imaging sensor.

23. The method of any of the embodiments 19-22, wherein the step of processing the position and/or contact force related parameter comprises determining a blood vessel deformation parameter of a blood vessel present in an image obtained by the imaging sensor as a basis for the position control signal.

24. The method of any of the embodiments 19-23, wherein the step of processing the position and/or contact force related parameter comprises determining the position and/or size of the surface area of the contact surface which is in contact with the human or animal body in an image obtained by the imaging sensor as a basis for the position control signal.

The invention claimed is:

1. A cannula insertion system configured to insert a cannula into a human or animal body, comprising:
 a contact sensor positioning system arranged to determine a suitable location for insertion of the cannula, wherein the contact sensor positioning system comprises:
 a contact sensor having a contact surface to be placed at least partially on the human or animal body to enable measurement with said contact sensor, wherein the contact sensor is an imaging sensor;
 a positioning device configured to support and position the contact sensor;
 a control device arranged to control the positioning device to position the contact sensor in a desired position; and
 a processing device,
 wherein the contact sensor positioning system comprises one or more sensors to determine a position and/or contact force related parameter representative of a position and/or contact force of the contact sensor,
 wherein the processing device is configured to process the position and/or contact force related parameter and provide a position control signal to the control device on the basis of the position and/or contact force related parameter,
 wherein the processing device is configured to determine the position control signal by image processing of one or more images obtained by the imaging sensor, and
 wherein the position control signal, when used by the control device to position the contact sensor, is configured to move the contact sensor in an automated scanning movement, wherein the automated scanning movement comprises movement of the contact sensor in a direction transverse to an insertion direction of the cannula until a blood vessel is identified in the one or more images obtained by the imaging sensor.

2. The cannula insertion system of claim 1, wherein the processing device is configured to determine a blood vessel deformation parameter of a blood vessel present in the one or more images obtained by the imaging sensor as a basis for the position control signal, wherein the blood vessel deformation parameter is based on the cross section of the blood vessel.

3. The cannula insertion system of claim 2, wherein the blood vessel deformation parameter is determined on the basis of a relationship between a long axis and a short axis of the cross section of the blood vessel.

4. The cannula insertion system of claim 2, wherein the processing device is further configured to determine, based on the blood vessel deformation parameter, whether the blood vessel is an artery or a vein.

5. The cannula insertion system of claim 1, wherein the position and/or contact force related parameter comprises a contact force with which the contact surface is pressed against the human or animal body.

6. The cannula insertion system of claim 1, wherein the position and/or contact force related parameter comprises a size and/or position of a surface area of the contact surface which is in contact with the human or animal body.

7. The cannula insertion system of claim 1, wherein the position and/or contact force related parameter comprises a torque being exerted on the contact surface.

8. The cannula insertion system of claim 1, wherein the contact sensor and the one or more sensors are the same sensor.

9. The cannula insertion system of claim 1, wherein the processing device is configured to determine a blood vessel deformation parameter of the blood vessel present in the one or more images obtained by the imaging sensor as a basis for the position control signal.

10. The cannula insertion system of claim 1, wherein the processing device is configured to determine the position and/or size of the surface area of the contact surface which is in contact with the human or animal body in an image obtained by the imaging sensor as a basis for the position control signal.

11. The cannula insertion system of claim 1, wherein the processing device is configured to determine a position and/or size of a vein present in an image obtained by the imaging sensor as a basis for the position control signal.

12. The cannula insertion system of claim 1, wherein the one or more sensors comprise at least one contact force sensor to determine a contact force exerted on the contact surface.

13. The cannula insertion system of claim 1, wherein the one or more sensors comprise a torque sensor and/or a combination of at least two contact force sensors to determine a torque exerted on the contact surface.

14. The cannula insertion system of claim 1, wherein the one or more sensors comprise a first distance sensor arranged to measure a first distance between the contact surface and the human or animal body near a first end of the contact surface and a second distance sensor arranged to measure a second distance between the contact surface and the human or animal body near a second end of the contact surface, the second end being opposite to the first end, wherein the processing device is configured to provide a position control signal to adapt the position of the contact sensor on the basis of the first distance and the second distance.

15. The cannula insertion system of claim 1, wherein the contact sensor is an ultrasound transducer.

16. The cannula insertion system of claim 1, wherein the positioning device comprises a robot arm.

17. The cannula insertion system of claim 1, wherein the cannula insertion system comprises:
    a cannula insertion device configured to insert the cannula into the human or animal body,
    a cannula insertion device positioning system to support and position the cannula insertion device, and
    a control device arranged to control the positioning system to position the cannula insertion device in a suitable position to insert the cannula into human or animal body.

18. The cannula insertion system of claim 1, wherein the cannula insertion system is an autonomous cannula insertion system comprising a robotic system configured to autonomously insert the cannula into the human or animal body.

19. The cannula insertion system of claim 1, wherein the cannula insertion system comprises a robotic system to autonomously draw blood from the blood vessel.

20. The cannula insertion system of claim 1, wherein the cannula insertion system further comprises the cannula and the cannula is aligned with the center part of the contact surface of the contact sensor.

21. A method to automatically position a contact sensor in a system configured to insert a cannula into a human or animal body, the contact sensor having a contact surface to be placed at least partially on the human or animal body to enable measurement with said contact sensor, the method comprising the steps of:
    measuring, using one or more sensors, a position and/or contact force related parameter representative of a position and/or contact force of the contact sensor, wherein the contact sensor is an imaging sensor,
    processing, with a processing device, the position and/or contact force related parameter sensor and providing a position control signal to a control device on the basis of the position and/or contact force related parameter and the image processing of one or more images obtained by the imaging sensor, and
    controlling, with the control device, a positioning device configured to support and position the contact sensor to position the contact sensor in a desired position,
    wherein the position control signal, when used by the control device to position the contact sensor, is configured to move the contact sensor in an automated scanning movement, wherein the automated scanning movement comprises movement of the contact sensor in a direction transverse to an insertion direction of the cannula until a blood vessel is identified in the one or more images obtained by the imaging sensor.

22. The method of claim 21, wherein the position and/or contact force related parameter comprises a contact force with which the contact surface is pressed against the human or animal body.

23. The method of claim 21, wherein the method comprises the step of determining a blood vessel deformation parameter of a blood vessel present in an image obtained by the imaging sensor as a basis for the position control signal, wherein the blood vessel deformation parameter is based on the cross section of the blood vessel.

24. The method of claim 23, wherein the blood vessel deformation parameter is determined on the basis of a relationship between a long axis and a short axis of the cross section of the blood vessel.

25. The method of claim 21, wherein the position and/or contact force related parameter comprises a size and/or position of a surface area of the contact surface which is in contact with the human or animal body.

26. The method of claim 21, wherein the contact sensor and the one or more sensors are the same sensor, and wherein the step of processing the position and/or contact force related parameter comprises image processing of the images obtained by the imaging sensor.

27. The method of claim 21, wherein the step of processing the position and/or contact force related parameter comprises determining a blood vessel deformation parameter of a blood vessel present in an image obtained by the imaging sensor as a basis for the position control signal.

28. The method of claim 21, wherein the step of processing the position and/or contact force related parameter comprises determining the position and/or size of the surface area of the contact surface which is in contact with the human or animal body in an image obtained by the imaging sensor as a basis for the position control signal.

* * * * *